(No Model.)
G. W. POMROY & C. A. HATCH.
BALL BEARING AXLE FOR CARRIAGES.
No. 534,757. Patented Feb. 26, 1895.
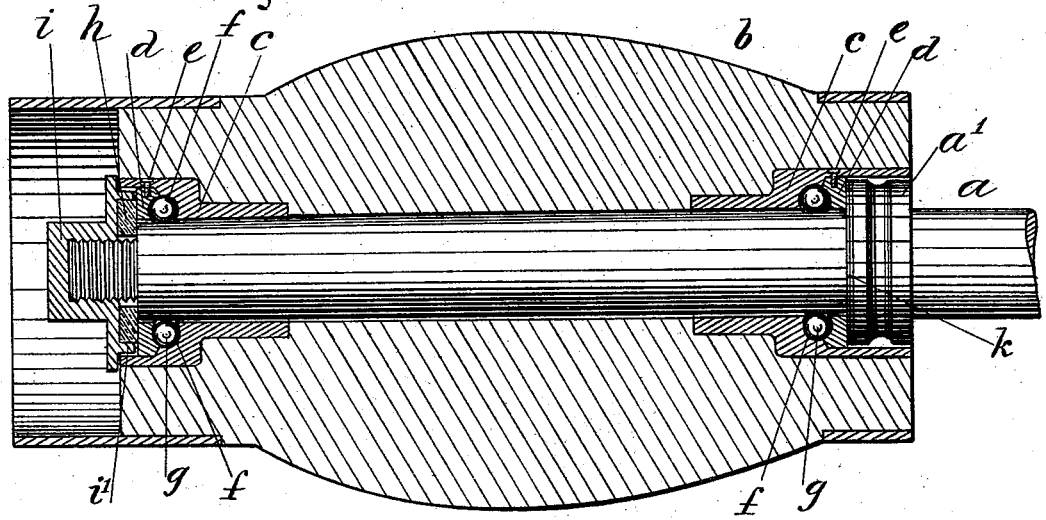
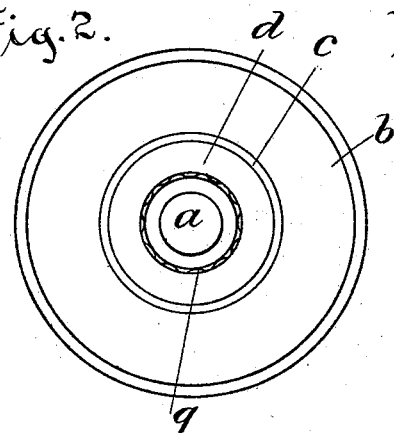
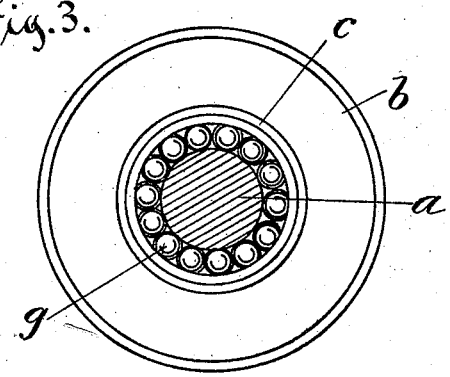
Witnesses:
J. A. Cantin
Arthur P. Jenkins
Inventors:
George W. Pomroy
Charles A. Hatch
By Chas. L. Burdett,
attorney.

UNITED STATES PATENT OFFICE.

GEORGE W. POMROY AND CHARLES A. HATCH, OF HARTFORD, CONNECTICUT; SAID HATCH ASSIGNOR TO SAID POMROY.

BALL-BEARING AXLE FOR CARRIAGES.

SPECIFICATION forming part of Letters Patent No. 534,757, dated February 26, 1895.

Application filed September 27, 1894. Serial No. 524,253. (No model.)

*To all whom it may concern:*

Be it known that we, GEORGE W. POMROY and CHARLES A. HATCH, citizens of the United States, and residents of Hartford, in the county of Hartford and State of Connecticut, have invented certain new and useful Improvements in Ball-Bearing Axles for Carriages, of which the following is a full, clear, and exact decription, whereby any one skilled in the art can make and use the same.

The object of our invention is to provide a ball bearing for axles more especially adapted for use on carriages and the like, that shall be simple and cheap as to construction and one that can be easily taken apart or assembled for any purpose.

To this end our invention consists in the combination in a ball bearing axle of the several parts making up the device as a whole as more particularly hereinafter described and pointed out in the claims.

Referring to the drawings: Figure 1 is a view in central section through the hub of the wheel showing our improvement. Fig. 2 is a detail end view of the same with the nut and packing removed. Fig. 3 is a detail view in section through the axle on a line with the ball race, looking from the inner end of the hub and with the outer section of the ball case removed.

In the accompanying drawings the letter $a$ denotes the end of an axle arm and $b$ the hub of a wheel mounted thereon. The axle arm $a$ is provided with an enlarged portion or shoulder $a'$ located in such position as to engage the inner end of the hub of the wheel.

In the hub $b$ at each end is secured the inner section $c$ of a ball case, the opening through this case being preferably slightly larger than the axle arm that extends therethrough. An outer section $d$ of the ball case is also secured in each end of the hub $b$ preferably by means of screws $e$ passing through the inner section $c$ of the ball case into the outer section $d$. A shoulder is located on the inside of the inner section of the ball case against which the outer section of the ball case rests, and the nut $i$ bears against the outer section to hold it against its seat on the shoulder within the inner section of the ball case. The outer and inner sections of the ball case are concaved on their meeting surfaces, a ball race $f$ being formed between the two sections of the ball case at each end of the hub, balls $g$ being located in the ball race. These balls are preferably of a size to support the ball case immediately on the axle arm, a space being left between the axle arm and said case.

On the outer end of the axle arm is a dust guard or washer $h$ which may be made of any desired material, and of a size to cover the opening between the axle arm and the ball case to prevent dust or dirt from entering therein. The usual nut $i$ is secured to the outer end of the axle arm, and is preferably provided on its inner side with an annular flange $i'$, this flange being of a diameter to closely embrace the dust guard $h$. The outer section of the ball case snugly fits within the inner section as shown, a flange on the inner section extending outward to the end of the hub of the wheel. A dust guard may also be placed between the ball case and the shoulder on the axle arm at the inner end of the hub if desired.

The ball bearings rest and run directly on the surface of the axle arm which is hardened to resist wear but in case there should be any wear of the surface the hub may be set up nearer to the collar $a'$ by taking out one of the washers $k$ located against the inner face of the collar $a'$ and between it and the outer section $d$ of the ball case. This adjustment of the hub on the arm changes the place of bearing of the balls on the surface of the axle arm. By adding other washers the place of bearing can be shifted in the opposite direction.

We claim as our invention—

1. In combination with an axle arm, a hub, the inner section of a ball case secured within the hub, the outer section of the ball case located within the inner section and resting against a shoulder thereon, balls located between the two sections and bearing against the axle arm, a nut secured to the outer end of the axle arm and overlying the end of the inner section of the ball case and resting against the outer section of said case, all substantially as described.

2. In combination with an axle arm, a hub, the inner section of a ball case secured therein, the outer section of a ball case located within the inner section and resting against a shoulder therein, balls located between the outer and inner sections, a nut secured to the outer end of the arm, and overlying the end of the ball case, and having an annular flange located on the inner side of the nut and resting against the outer section of the ball case whereby the latter is held against the shoulder on the inner section, all substantially as described.

3. In combination with an axle arm, a hub, the inner section of a ball case secured therein, the outer section of a ball case secured against a shoulder within the inner section, balls located between the two sections of the case and the axle arm, a nut overlying the end of the inner section of the ball case, and having an annular flange located on the inner surface of the nut and resting against the outer section of the ball case, whereby a dust guard chamber is provided within the nut, all substantially as described.

GEORGE W. POMROY.
CHARLES A. HATCH.

Witnesses:
CHAS. L. BURDETT,
ARTHUR B. JENKINS.